United States Patent
Rios et al.

(10) Patent No.: US 9,669,938 B2
(45) Date of Patent: Jun. 6, 2017

(54) UPPER BIFI FRAME FOR A GAS TURBINE ENGINE AND METHODS THEREFOR

(71) Applicant: UNITED TECHNOLOGIES CORPORATION, Farmington, CT (US)

(72) Inventors: Joseph Rios, Meriden, CT (US); John C. Ditomasso, Glastonbury, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 70 days.

(21) Appl. No.: 14/599,022

(22) Filed: Jan. 16, 2015

(65) Prior Publication Data

US 2016/0207632 A1    Jul. 21, 2016

(51) Int. Cl.
| | | |
|---|---|---|
| *B64D 27/00* | (2006.01) | |
| *B64D 29/06* | (2006.01) | |
| *B64D 27/26* | (2006.01) | |
| *F02K 3/06* | (2006.01) | |
| *F02C 7/20* | (2006.01) | |
| *B64D 27/12* | (2006.01) | |
| *F02C 7/28* | (2006.01) | |

(52) U.S. Cl.
CPC ............ *B64D 29/06* (2013.01); *B64D 27/12* (2013.01); *B64D 27/26* (2013.01); *F02C 7/20* (2013.01); *F02C 7/28* (2013.01); *F02K 3/06* (2013.01); *B64D 2027/264* (2013.01)

(58) Field of Classification Search
None
See application file for complete search history.

(56) References Cited

U.S. PATENT DOCUMENTS

| | | | | |
|---|---|---|---|---|
| 1,723,763 | A | * | 8/1929 | Burnelli ................. B64D 27/08 244/54 |
| 3,540,682 | A | | 11/1970 | Dibble et al. |
| 3,848,832 | A | * | 11/1974 | Stanley .................. B64D 27/18 244/54 |

(Continued)

FOREIGN PATENT DOCUMENTS

| | | |
|---|---|---|
| EP | 2085599 A2 | 8/2009 |
| EP | 2071930 | 6/2012 |

(Continued)

OTHER PUBLICATIONS

European Search Report for Application No. 16151755.2-1607; Date of Mailing: Jun. 13, 2016.

*Primary Examiner* — Medhat Badawi
(74) *Attorney, Agent, or Firm* — Cantor Colburn LLP (57) ABSTRACT

An upper bifi frame for preventing air leakage in a gas turbine engine including an engine casing and a fan case is provided. The upper bifi frame includes a forward fairing having a forward fairing midsection extending between the engine casing and the fan case. The forward fairing has a forward fairing first end including a flange configured to couple to the engine casing. The forward fairing has a forward fairing second end extending from the forward fairing midsection and configured to couple to the fan case. At least one aft seal is secured to the forward fairing and forms a seal therewith. A wedge seal is coupled to the forward fairing and the at least one aft seal and is operative to prevent air leakage to a pylon that is secured to the engine casing.

20 Claims, 9 Drawing Sheets

(56) References Cited

U.S. PATENT DOCUMENTS

| | | | | |
|---|---|---|---|---|
| 6,802,479 | B2* | 10/2004 | Howe | B64D 37/00 244/129.1 |
| 7,971,825 | B2* | 7/2011 | Diochon | B64D 27/18 244/54 |
| 8,118,251 | B2* | 2/2012 | Suciu | B64D 27/18 244/54 |
| 8,137,060 | B2 | 3/2012 | Winter et al. | |
| 8,172,527 | B2* | 5/2012 | Duchatelle | B64D 27/26 415/211.2 |
| 8,418,471 | B2 | 4/2013 | Baltas | |
| 8,769,925 | B2 | 7/2014 | Winter et al. | |
| 2005/0081531 | A1* | 4/2005 | Stretton | B64D 27/16 60/797 |
| 2008/0200299 | A1* | 8/2008 | Russ | F02C 7/32 475/331 |
| 2009/0188232 | A1* | 7/2009 | Suciu | B64D 27/18 60/39.83 |
| 2009/0245997 | A1* | 10/2009 | Hurwitz | F01D 17/08 415/1 |
| 2010/0000199 | A1* | 1/2010 | McVey | F02K 1/06 60/226.1 |
| 2010/0011740 | A1* | 1/2010 | McVey | F02K 1/1207 60/204 |
| 2010/0043390 | A1* | 2/2010 | Jain | B64D 15/16 60/204 |
| 2010/0236216 | A1* | 9/2010 | Winter | F01D 21/00 60/204 |
| 2012/0102915 | A1 | 5/2012 | Baltas | |
| 2013/0319002 | A1 | 12/2013 | Sidelkovskiy et al. | |
| 2014/0161050 | A1* | 6/2014 | Grinshpun | H04L 65/4069 370/329 |
| 2014/0239083 | A1 | 8/2014 | Suciu et al. | |
| 2014/0248119 | A1 | 9/2014 | Jen et al. | |

FOREIGN PATENT DOCUMENTS

| | | |
|---|---|---|
| GB | 2401654 A | 11/2004 |
| WO | 2014193515 A2 | 12/2014 |

* cited by examiner

UPPER BIFI FRAME FOR A GAS TURBINE ENGINE AND METHODS THEREFOR

TECHNICAL FIELD OF THE DISCLOSED EMBODIMENTS

The present disclosures relate generally to a gas turbine engine and, more particularly, to an upper bifi frame for a gas turbine engine.

BACKGROUND OF THE DISCLOSED EMBODIMENTS

Generally, a gas turbine engine includes an engine casing that is secured to a pylon of an aircraft. A nacelle is positioned around the engine casing. A thrust reverser is typically coupled to the engine casing. During operation, fan flow air through the gas turbine engine needs to be sealed off from the pylon and directed around the nacelle doors. An upper bifi frame provides seal lands for sealing the fan flow from the fan, pylon, and core compartments. The upper bifi frame may include a cover to prevent fluid accumulation within the gas turbine engine. The upper bifi frame may also include silicone seals to allow for increased clearance with nacelle hardware during engine drop.

Unfortunately, the nacelle doors typically open only approximately 45°. With this limited access, the upper bifi frame frequently blocks access to the engine casing and other components housed within the nacelle. Moreover, the upper bifi frame often adds difficulty when dropping or raising the engine casing with respect to the pylon. In particular, known upper bifi frames are required to be entirely removed during engine dropping or raising. This can result in damage to the gas turbine engine.

SUMMARY OF THE DISCLOSED EMBODIMENTS

In one aspect, an upper bifi frame for preventing air leakage in a gas turbine engine including an engine casing and a fan case is provided. The upper bifi frame includes a forward fairing having a forward fairing midsection extending between the engine casing and the fan case. The forward fairing has a forward fairing first end including a flange configured to couple to the engine casing. The forward fairing has a forward fairing second end extending from the forward fairing midsection and configured to couple to the fan case. At least one aft seal is secured to the forward fairing and forms a seal therewith. A wedge seal is coupled to the forward fairing and the at least one aft seal and is operative to prevent air leakage to a pylon that is secured to the engine casing.

In a further embodiment of the above, the at least one aft seal includes an aft seal midsection extending along the forward fairing midsection and forming a seal therewith. An aft seal first end extends along the forward fairing first end and forms a seal therewith. An aft seal second end extends along the forward fairing second end and forms a seal therewith.

In a further embodiment of the any of the above, the at least one aft seal includes a left aft seal and a right aft seal. The left aft seal is coupled to a first side of the forward fairing. The right aft seal is coupled to a second side of the forward fairing.

In a further embodiment of the any of the above, the at least one aft seal is removable from the forward fairing to allow at least one of raising or dropping the gas turbine engine.

In a further embodiment of the any of the above, the gas turbine engine may be at least one of raised or dropped while the forward fairing is joined to the engine casing.

In a further embodiment of the any of the above, the at least one aft seal includes a pin operable to secure the at least one aft seal to the forward fairing. A bolt is operable to lock the at least one aft seal to the forward fairing.

In a further embodiment of the any of the above, the wedge seal provides a seal between a hinge beam of at least one nacelle door and the at least one aft seal.

In a further embodiment of the any of the above, the gas turbine engine upper bifi frame forms a fairing for the pylon.

In one aspect, a gas turbine engine is provided having an engine casing, a fan case positioned around the engine casing, and a pylon attached to the engine casing and operative to secure the engine casing to an aircraft. An upper bifi frame is provided having a forward fairing coupled between the engine casing and the fan case. At least one aft seal is secured to the forward fairing. A wedge seal is coupled to the forward fairing and the at least one aft seal and is operative to prevent air leakage to the pylon.

In a further embodiment of the above, the at least one aft seal comprises a left aft seal and a right aft seal. The left aft seal is coupled to a first side of the forward fairing. The right aft seal is coupled to a second side of the forward fairing.

In a further embodiment of the any of the above, the at least one aft seal is removable from the forward fairing to allow at least one of raising or dropping the gas turbine engine while the forward fairing is still secured to the engine casing.

In a further embodiment of the any of the above, a pin is operable to secure the at least one aft seal to the forward fairing.

In a further embodiment of the any of the above, a bolt is operable to lock the at least one aft seal to the forward fairing.

In a further embodiment of the any of the above, the at least one aft seal is removable from the forward fairing to allow access to the engine casing when at least one nacelle door is opened.

In a further embodiment of the any of the above, the wedge seal provides a seal between a hinge beam of at least one nacelle door and the at least one aft seal.

In a further embodiment of the any of the above, the upper bifi frame forms a fairing for the pylon.

In one aspect, a method of preventing air leakage in a gas turbine engine having an engine casing, a fan case positioned around the engine casing, at least one nacelle door that encloses a portion of the engine casing, and a pylon to secure the engine casing to an aircraft is provided. The method includes coupling a forward fairing of an upper bifi frame between the engine casing and the fan case. The method also includes securing at least one aft seal of the upper bifi frame to the forward fairing. The method also includes coupling a wedge seal to the forward fairing and the at least one aft seal.

In a further embodiment, the method also includes securing the at least one aft seal to the forward fairing with a pin.

In a further embodiment of the any of the above, the method also includes coupling a left aft seal to a first side of the forward fairing; and coupling a right aft seal to a second side of the forward fairing.

In a further embodiment of the any of the above, the at least one aft seal is removable from the forward fairing to allow access to the engine casing when the at least one nacelle door is opened.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

Figure 1:
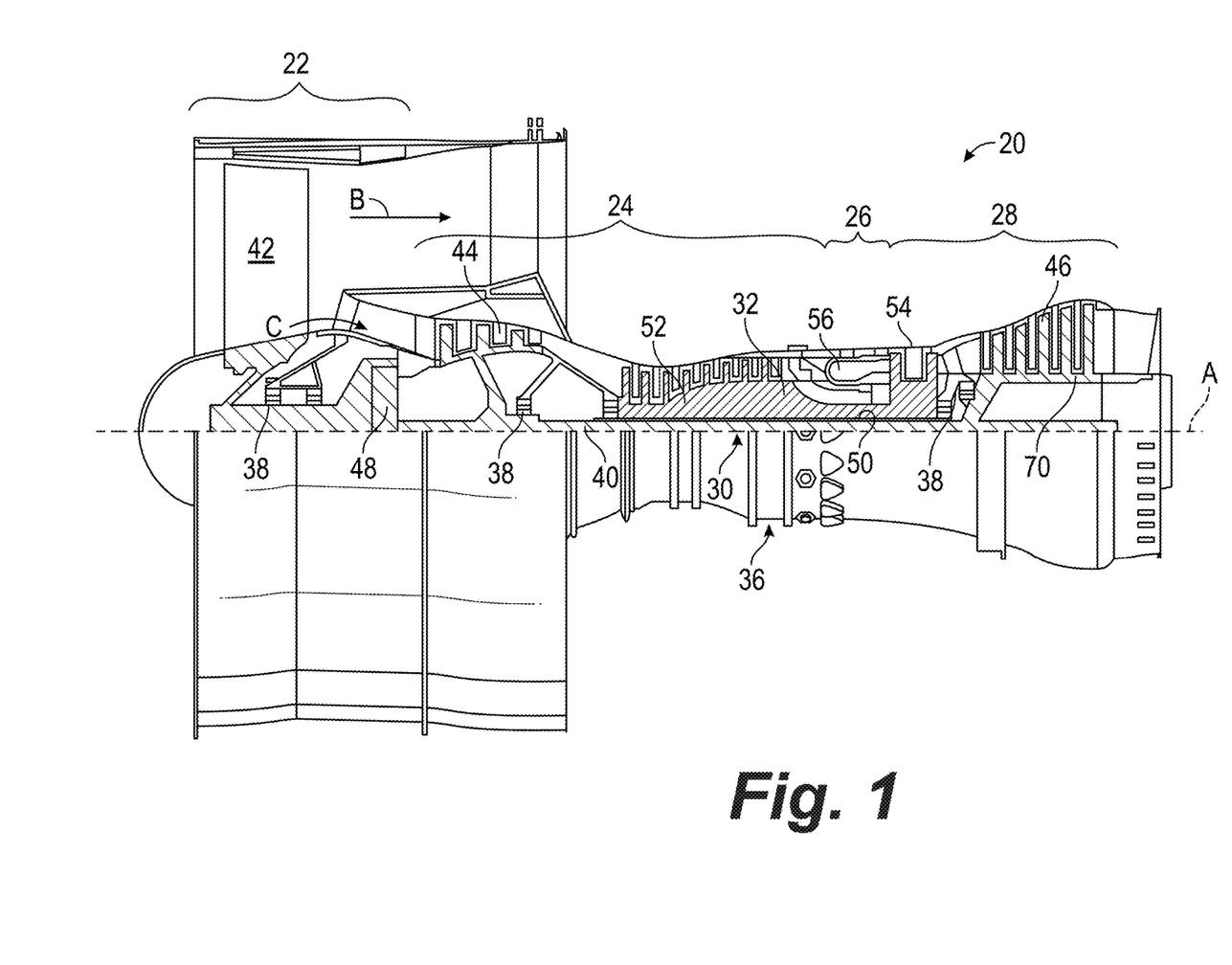
FIG. 1 is a sectional view of a gas turbine engine in an embodiment.

FIG. 1 shows a gas turbine engine 20, such as a gas turbine used for power generation or propulsion, circumferentially disposed about an engine centerline, or axial centerline axis A. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft. (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram° R)/(518.7° R)]$^{0.5}$. The "Low corrected fan tip speed" as disclosed herein according to one non-limiting embodiment is less than about 1150 ft/second (350.5 m/sec).

Figure 2:
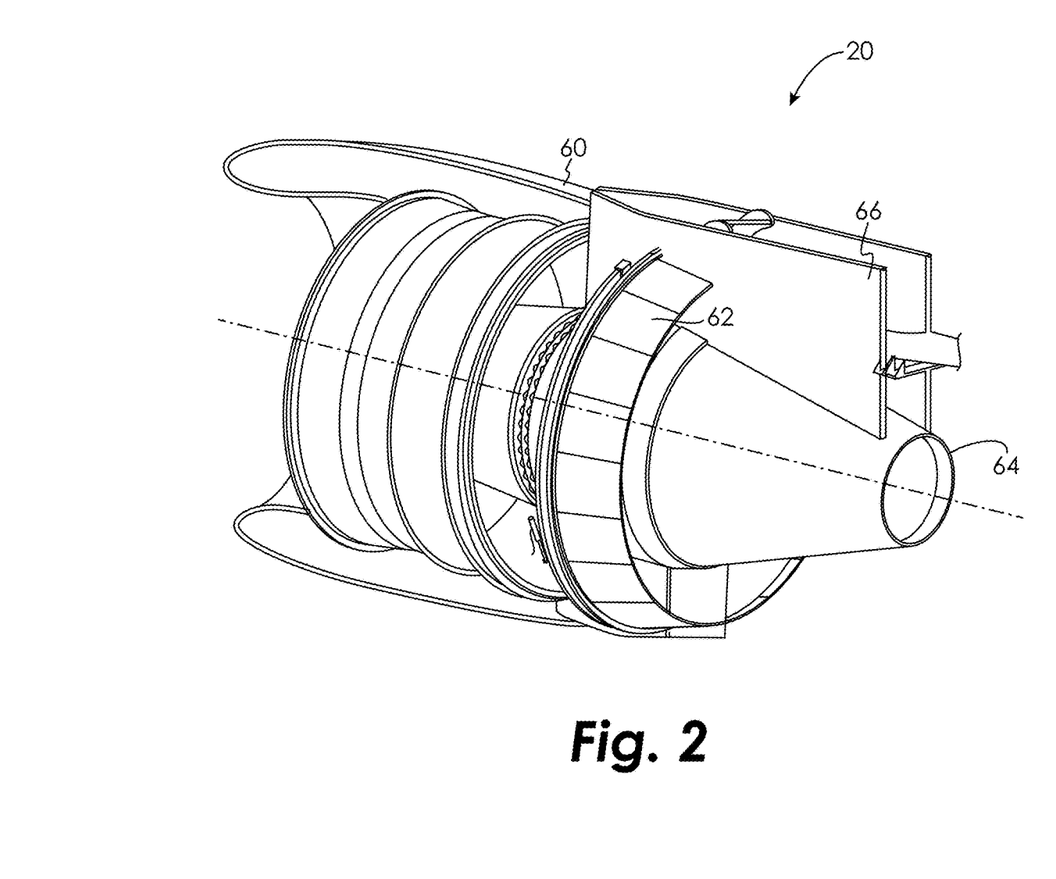
FIG. 2 is a side perspective view of a gas turbine engine in an embodiment.
Figure 3:
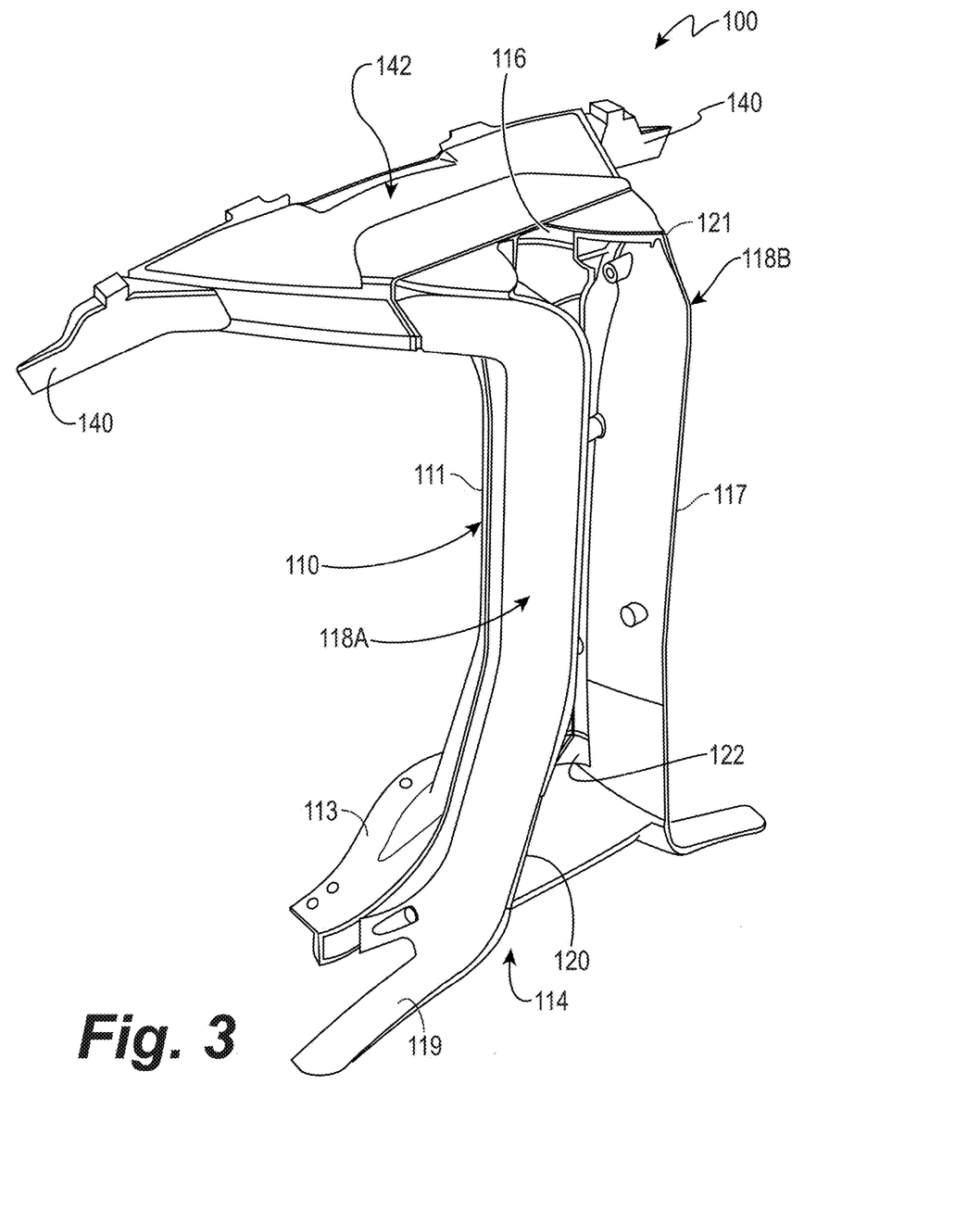
FIG. 3 is a side perspective view of an upper bifi frame in an embodiment.
Figure 4:
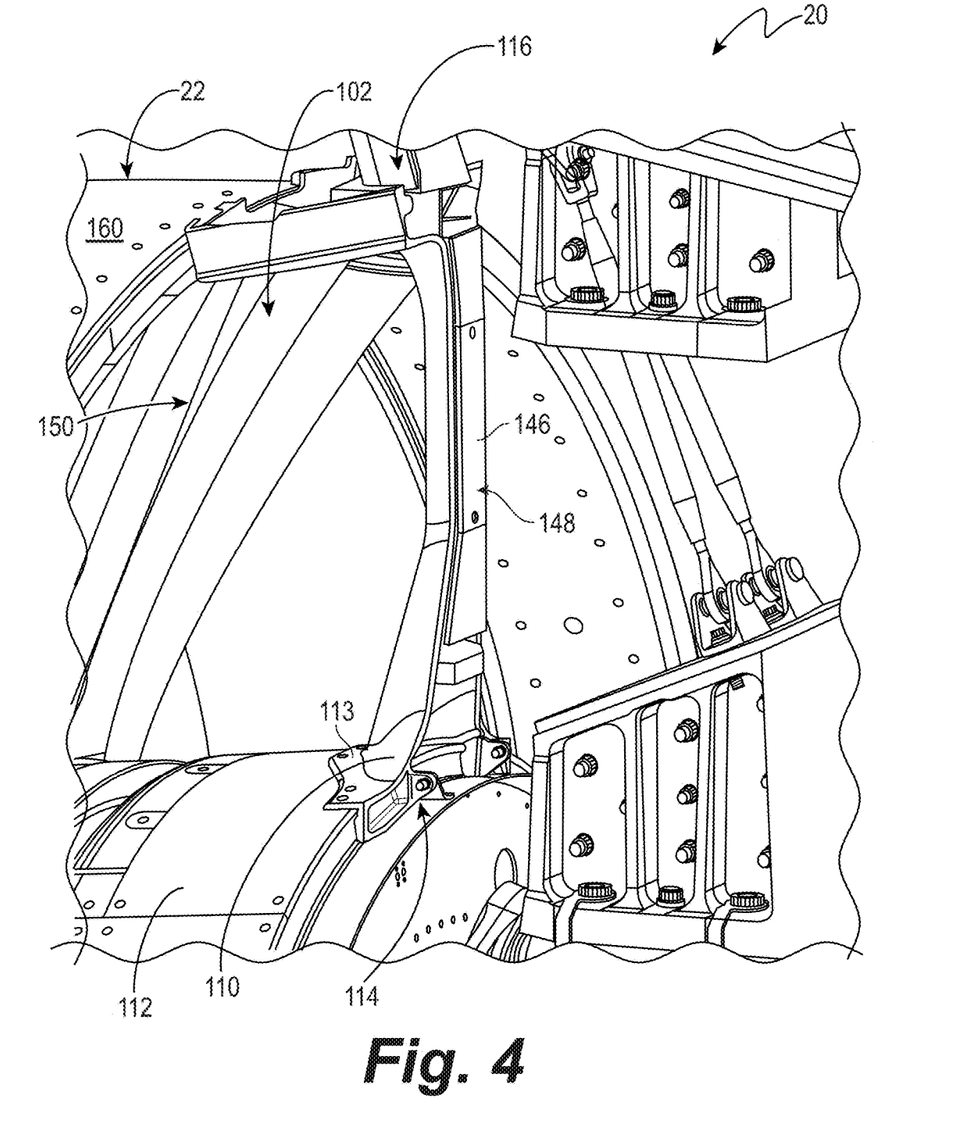
FIG. 4 is a side perspective view of a forward fairing of an upper bifi frame positioned in a gas turbine engine in an embodiment.
Figure 5:
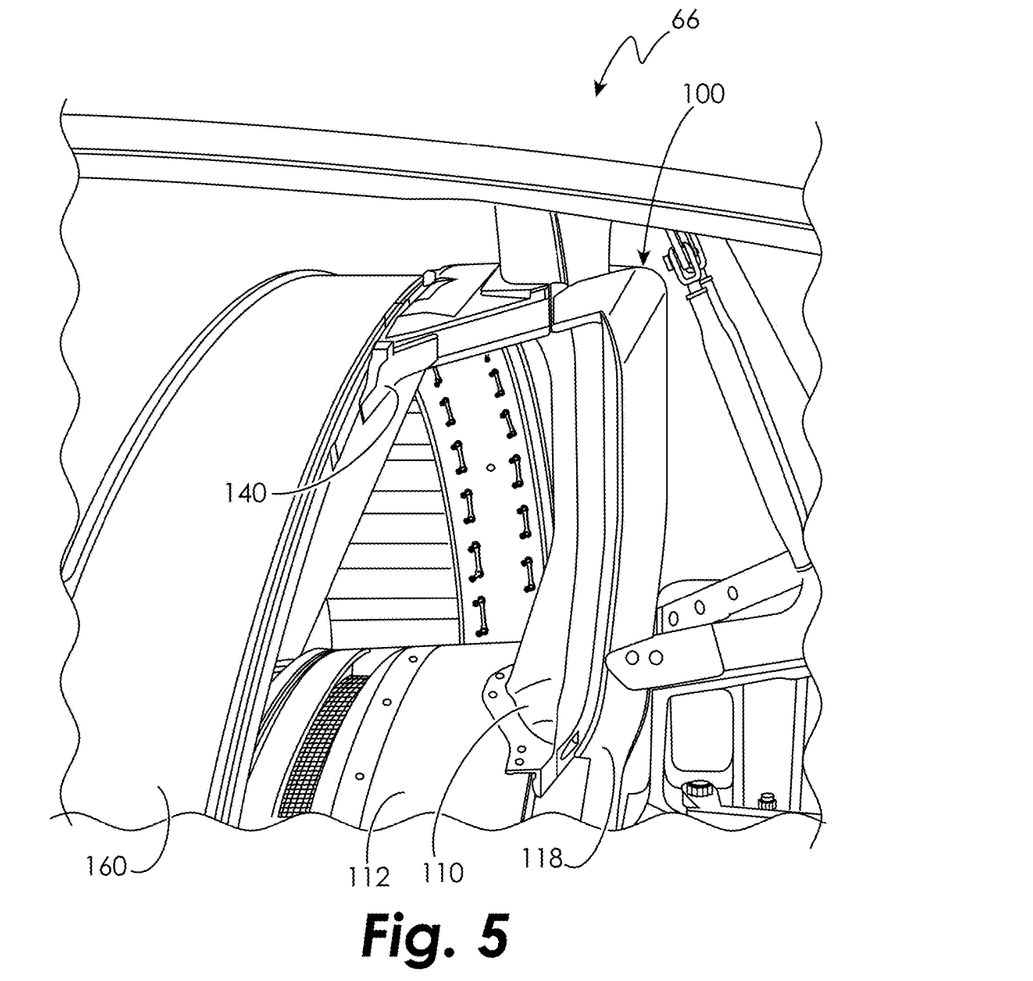
FIG. 5 is a side perspective view of an upper bifi frame positioned in gas turbine engine in an embodiment.
Figure 6:
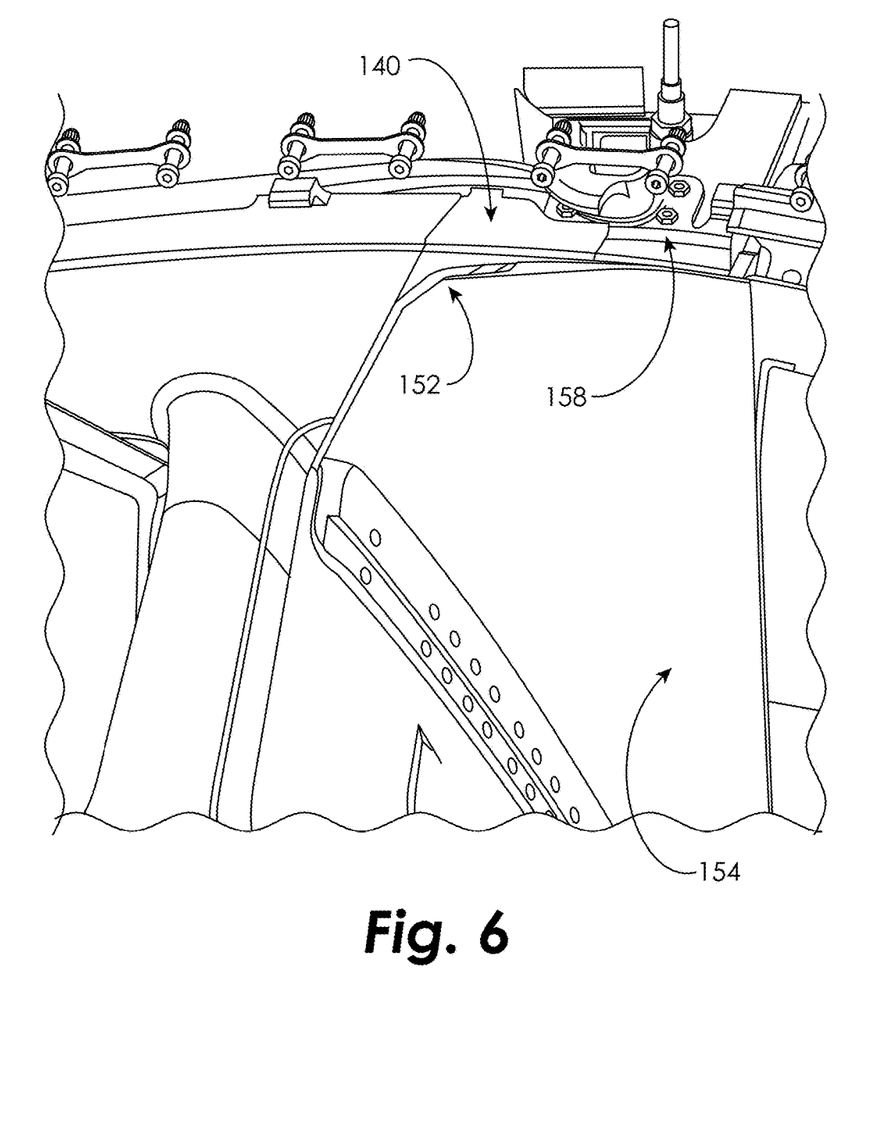
FIG. 6 is a side perspective view of a wedge seal positioned in a gas turbine engine in an embodiment.
Figure 7:
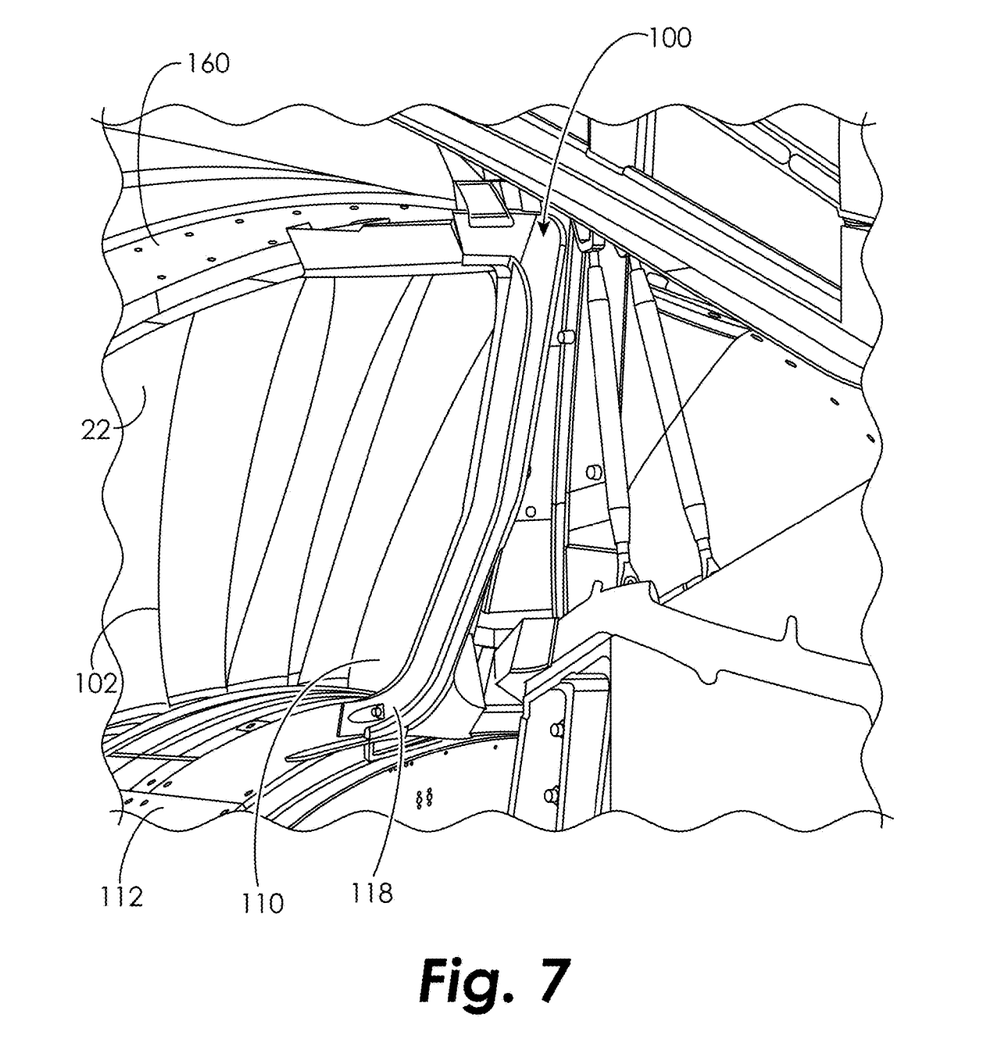
FIG. 7 is a side perspective view of an upper bifi frame positioned in a gas turbine engine in an embodiment.

Referring to FIG. 2, the engine 20 is suspended from an engine pylon 66 and mounted within a nacelle 60 through which most of the air pressurized by the fan section 22 bypasses the core engine itself for generating propulsion thrust. The fan air is discharged from the engine 20 through a thrust reverser 62. Core exhaust gases are discharged from the core engine through a core exhaust nozzle 64. The thrust reverser 62 defines a nozzle for discharging the fan air pressurized by the fan section 22.

Referring to FIGS. 3-7, an upper bifi frame 100 is installed in the engine 20. In one embodiment, the upper bifi frame 100 is positioned at a trailing edge of a fan flow path generated by the fan section 22. In one embodiment, the upper bifi frame 100 is positioned downstream from the airfoils 102 (shown in FIGS. 4 and 7) of the fan section 22. In one embodiment, the upper bifi frame 100 is positioned within the engine 20 where the engine 20 transitions to the nacelle 60. The upper bifi frame 100 is configured to provide an aerodynamic fairing around the pylon 66 (shown in FIG. 5).

The upper bifi frame 100 includes a forward fairing 110 that is secured to an engine casing 112 at a first end 114. A second end 116 of the forward fairing 110 is secured to the fan case 160. The forward fairing 110 includes a substantially linear midsection 111 that extends between the first end 114 and the second end 116. The first end 114 includes at least one flange 113 extending outward from the midsection 111. The at least one flange 113 is secured to the engine casing 112. The at least one flange 113 is secured to the engine casing 112 so that the midsection 111 extends upward from the engine casing 112. The second end 116 extends substantially perpendicular to the midsection 111. When secured within the engine 20, the second end 116 extends from the midsection 111 toward the fan case 160. The second end 116 is secured to the fan case 160 so that the midsection 111 is positioned downstream from the fan case 160.

At least one aft seal 118 is joined to the forward fairing 110. The at least one aft seal 118 is shaped to extend long the contours of the forward fairing 110. In particular, a midsection 117 of the at least one aft seal 118 extends along the midsection 111 of the forward fairing 110 and creates a seal therewith. A first end 119 of the at least one aft seal 118 extends along the first end 114 of the forward fairing 110 and creates a seal therewith. A second end 121 of the at least one aft seal 118 extends along the second end 116 of the forward fairing 110 and creates a seal therewith.

Figure 8:
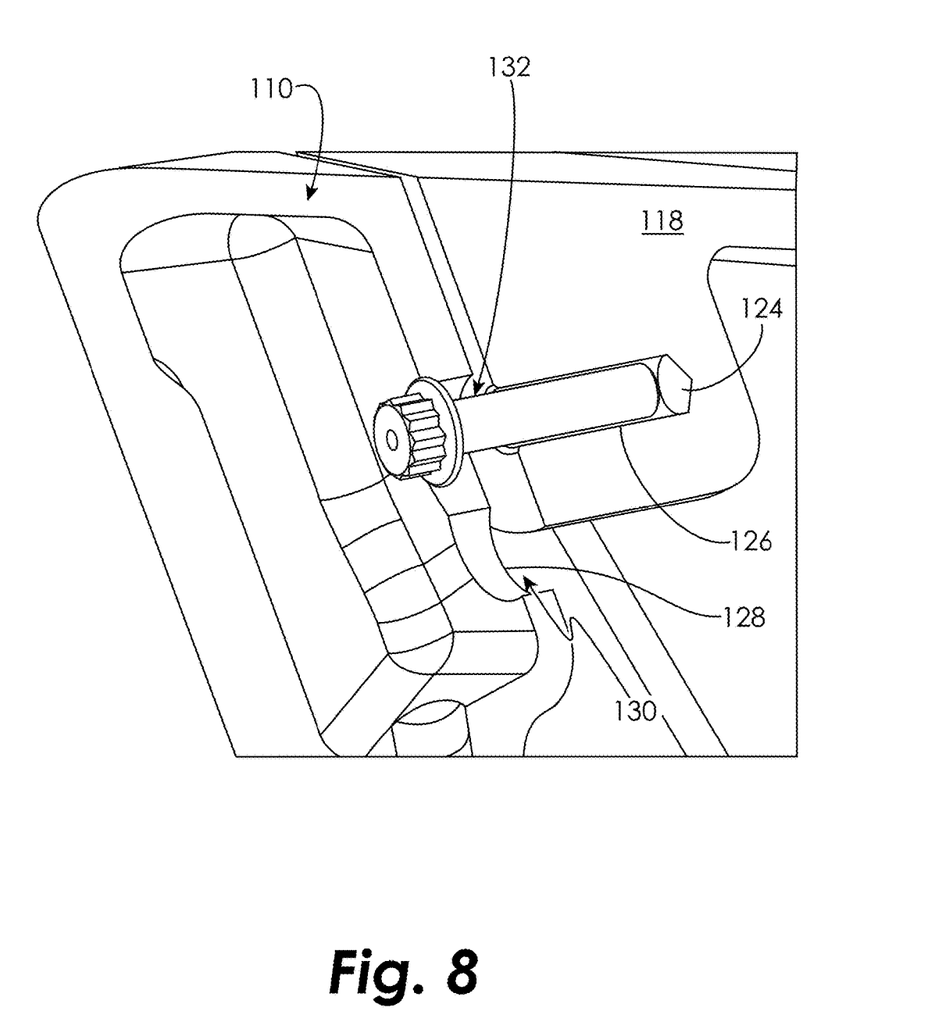
FIG. 8 is a side perspective view of an aft seal of an upper bifi frame coupled to a forward fairing of an upper bifi frame in an embodiment.
Figure 9:
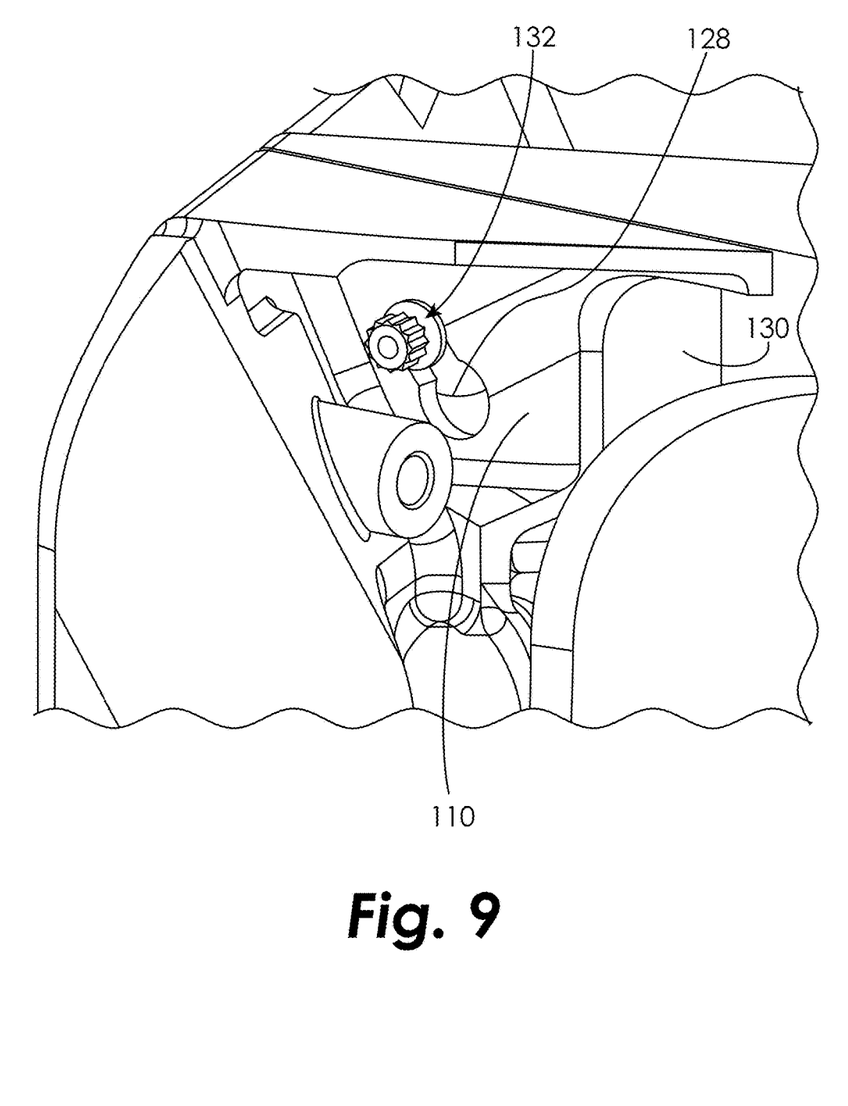
FIG. 9 is a side perspective view of an aft seal of an upper bifi frame coupled to a forward fairing of an upper bifi frame in an embodiment.

In an embodiment, a left aft seal 118A is secured to a first side 120 of the forward fairing 110, and a right aft seal 118B is secured to a second side 122 of the forward fairing 110. The aft seal 118 is secured to the forward fairing to seal the engine casing 112 to the thrust reverser 62. Referring to FIGS. 8-9 the at least one aft seal 118 is secured to the forward fairing 110 via a pin and key slot. The aft seal 118 includes a cavity 124 for retaining a pin 126. In one embodiment, the pin 126 is installed in the aft seal 118 during engine installation. In one embodiment, the pin 126 is secured within the aft seal 118 during manufacture of the aft seal 118. The forward fairing 110 includes a key slot 128. The key slot 128 includes a wide portion 130 and a narrow portion 132. During installation of the aft seal 118, the pin 126 is positioned in the wide portion 130 of the key slot 128 and the aft seal 118 is slid downward so that the pin 126 secures within the narrow portion 132 of the key slot 128. As such, the aft portion 118 is secured to the forward portion 110 without having to access a top of the upper bifi frame 100, which can be difficult to access. Once the aft seal 118 is secured to the forward fairing 110, a bolt (not shown) is inserted from below the upper bifi frame 100 to fix the aft seal 118 to the forward fairing 110.

Referring back to FIGS. 3-7 a wedge seal 140 is secured to the forward fairing 110 and the aft seals 118. In one embodiment, the wedge seal 140 is secured to the second end 116 of the forward fairing 110 and the corresponding ends of the aft seals 118. In one embodiment, the wedge seal 140 is secured adjacent to the nacelle 60. A cover 142 is positioned over the upper bifi frame 100 to seal the upper bifi frame 100.

The arrangement of the upper bifi frame 100 allows for raising or lowering the engine 20 from the pylon 66 without having to remove the forward fairing 110. With the forward fairing 110 secured to the engine 20 and the nacelle 60, the engine may be raised or lowered without the risk of the engine 20 falling because the engine 20 remains secured during movement. Additionally, to protect the upper bifi frame forward fairing 110 on its aft end 146, a bumper 148 is provided to withstand clashes with the pylon 66 during engine raise or drop. In particular, the bumper 148 absorbs any impact rather than the forward fairing 110.

In one embodiment, the wedge seal 140 allows clearance through the fan duct 150 to the nacelle 60. Additionally, the wedge seal 140 prevents leakage of air flow from the fan duct 150 to the pylon 66. In one embodiment, a pair of left and right wedge seals 140 fills a gap left by a hinge beam 152 (shown in FIG. 6) of the nacelle door 154. In one embodiment, the wedge seals 140 also seal against the hinge beam 152 of the nacelle door 154 (shown in FIG. 6). Seals 158 (shown in FIG. 6) on the hinge beam 152 seal against the upper bifi frame 100 and transition to the wedge seal 140. These seals 158 eventually transition to the fan case 160.

The cover 142 allows fluid to flow away from the upper bifi frame 100 to the fan case 160. Pockets within the upper bifi frame are filled with the cover 142. Filling the pockets deflects or directs potential air flow around the upper bifi frame 100. In one embodiment, the cover 142 is capable of withstanding hydraulic fluid, which is the fluid most likely to accumulate in the upper bifi frame 100. In one embodiment, the cover 142 is bonded to the upper bifi frame to seal the joint between the cover 142 and the upper bifi frame 100.

In one embodiment, the upper bifi frame provides improved access to the engine 20 when the nacelle door 154 is open. Particularly, the nacelle door 154 typically opens to approximately 45°. By removing the aft seals 118, while leaving the forward fairing 110 secured within the engine 20, improved access to the engine 20 may be achieved without removing the entire upper bifi frame 100.

In one embodiment, the upper bifi frame 100 prevents fan flow air from penetrating into the pylon 66, which may cause a loss in engine performance, introduce environment atmosphere into the pylon 66, or cause a breach of the fire containment zone. The upper bifi frame 100 design enables removal of only a portion of the upper bifi frame 100 during engine raise to the pylon 66 because the engine 20 can be raised or lowered to or from the pylon 66 without removing the main forward fairing 110. This reduces the installation time for the upper bifi frame 100. Additionally, the bumper 148 provides support to the upper bifi frame 100. The cover 142 directs fluid away from pooling areas within the upper bifi frame 100, thereby reducing the area where fluid accumulation may occur. In one embodiment, the fluid flows to and around the fan case 160 until it reaches the bottom of the engine 20, where the fluid drains from the engine 20 completely.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. An upper bifi frame for preventing air leakage in a gas turbine engine including an engine casing and a fan case, the upper bifi frame comprising:
    a forward fairing having a forward fairing midsection extending between the engine casing and the fan case, the forward fairing having a forward fairing first end including a flange to couple to the engine casing, the forward fairing having a forward fairing second end extending from the forward fairing midsection to couple to the fan case;
    at least one aft seal secured to the forward fairing and forming a seal; and
    a wedge seal coupled to the forward fairing and the at least one aft seal and operative to prevent air leakage to a pylon that is secured to the engine casing.

2. The upper bifi frame of claim 1, wherein the at least one aft seal comprises:
    an aft seal midsection extending along the forward fairing midsection and forming a seal;
    an aft seal first end extending along the forward fairing first end and forming a seal; and
    an aft seal second end extending along the forward fairing second end and forming a seal.

3. The upper bifi frame of claim 1, wherein the at least one aft seal comprises a left aft seal and a right aft seal, the left aft seal coupled to a first side of the forward fairing, the right aft seal coupled to a second side of the forward fairing.

4. The upper bifi frame of claim 1, wherein the at least one aft seal is removable from the forward fairing to allow at least one of raising or dropping the gas turbine engine.

5. The upper bifi frame of claim 3, wherein the gas turbine engine is at least one of raised or dropped while the forward fairing is joined to the engine casing.

6. The upper bifi frame of claim 1, wherein the at least one aft seal comprises:
    a pin operable to secure the at least one aft seal to the forward fairing; and
    a bolt operable to lock the at least one aft seal to the forward fairing.

7. The upper bifi frame of claim 1, wherein the wedge seal provides a seal between a hinge beam of at least one nacelle door and the at least one aft seal.

8. The upper bifi frame of claim 1, wherein the gas turbine engine upper bifi frame forms a fairing for the pylon.

9. A gas turbine engine comprising:
    an engine casing;
    a fan case positioned around the engine casing;
    a pylon attached to the engine casing and operative to secure the engine casing to an aircraft; and
    an upper bifi frame comprising:
        a forward fairing coupled between the engine casing and the fan case;
        at least one aft seal secured to the forward fairing; and
        a wedge seal coupled to the forward fairing and the at least one aft seal and operative to prevent air leakage to the pylon.

10. The gas turbine engine of claim 9, wherein the at least one aft seal comprises a left aft seal and a right aft seal, the left aft seal coupled to a first side of the forward fairing, the right aft seal coupled to a second side of the forward fairing.

11. The gas turbine engine of claim 9, wherein the at least one aft seal is removable from the forward fairing to allow at least one of raising or dropping the gas turbine engine while the forward fairing is still secured to the engine casing.

12. The gas turbine engine of claim 9 further comprising a pin operable to secure the at least one aft seal to the forward fairing.

13. The gas turbine engine of claim 12 further comprising a bolt operable to lock the at least one aft seal to the forward fairing.

14. The gas turbine engine of claim 9, wherein the at least one aft seal is removable from the forward fairing to allow access to the engine casing when at least one nacelle door is opened.

15. The gas turbine engine of claim 9, wherein the wedge seal provides a seal between a hinge beam of at least one nacelle door and the at least one aft seal.

16. The gas turbine engine of claim 9, wherein the upper bifi frame forms a fairing for the pylon.

17. A method of preventing air leakage in a gas turbine engine having an engine casing, a fan case positioned around the engine casing, at least one nacelle door that encloses a portion of the engine casing, and a pylon to secure the engine casing to an aircraft, the method comprising:
    coupling a forward fairing of an upper bifi frame between the engine casing and the fan case;
    securing at least one aft seal of the upper bifi frame to the forward fairing; and
    coupling a wedge seal to the forward fairing and the at least one aft seal.

18. The method of claim 17 further comprising securing the at least one aft seal to the forward fairing with a pin.

19. The method of claim 17 further comprising further comprising:
    coupling a left aft seal to a first side of the forward fairing; and
    coupling a right aft seal to a second side of the forward fairing.

20. The method of claim 17, wherein the at least one aft seal is removable from the forward fairing to allow access to the engine casing when the at least one nacelle door is opened.

* * * * *